3,110,719
MANUFACTURE OF TETRAETHYLLEAD
Gregory Dexter Hedden, Madison, Wis., assignor to E. I. du Pont de Nemours and Company, Wilmington, Del., a corporation of Delaware
No Drawing. Filed June 21, 1960, Ser. No. 37,574
16 Claims. (Cl. 260—437)

This invention relates to the manufacture of tetraethyllead, and more particularly to a novel catalytic process for converting to tetraethyllead high-boiling alkyllead compounds which are obtained as by-products in the manufacture of tetraethyllead.

Tetraethyllead is ordinarily manufactured by the ethylation of sodium lead alloy, that is, by the reaction of ethyl chloride with sodium lead alloy. In such manufacture, there is ordinarily obtained a minor proportion of by-product tetraalkyllead compounds which are higher-boiling than tetraethyllead. A major constituent of the high-boiling compositions is 1,2-dimethylethylene bis(triethyllead), which may be represented by the formula

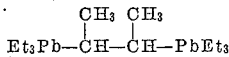

Small amounts of other high-boiling lead-containing compounds of undetermined constitution may also be present, as well as high-boiling lead-free oils. Such high-boiling ethylated lead compounds frequently amount to from about 2% to about 4% or more by weight of the organic products of ethylation reaction.

Tetraethyllead is ordinarily recovered from the ethylation reaction mass by steam distillation. The bulk of the high-boiling by-products remain behind with the inorganic products or unreacted lead sludge during the steam distillation. When such inorganic products or sludge is treated to recover the lead therefrom, the high-boiling ethylated lead compounds are destroyed. The portion of the high-boiling ethylated lead by-product, which passes over with the tetraethyllead during the steam distillation, may be used with the tetraethyllead in antiknock compositions, apparently without detriment to the antiknock composition or the fuel containing it. However, such high-boiling compounds have the drawback, relative to tetraethyllead, of sluggish inductibility into the engine because of their low volatility.

Such high-boiling ethylated lead fraction constitutes a loss of valuable organic lead compounds. The 1,2-dimethylethylene bis(triethyllead), for example, theoretically could be converted to tetraethyllead, 2 molecules thereof being equivalent to 3 molecules of tetraethyllead. Thus, the high-boiling ethylated lead fraction constitutes a theoretical tetraethyllead value which can be determined by analyzing the residue by known methods as if it were tetraethyllead, for example, by iodine titration. The conversion of such high-boiling ethylated lead fraction to tetraethyllead would constitute a valuable economic advantage. However, such fraction has been difficult to recover and methods for converting it to tetraethyllead have not been known. For example, catalysts such as carbon, which are known to convert hexaethyldilead to tetraethyllead, are ineffective for converting the other high-boiling ethylated lead compounds, such as 1,2-dimethylethylene bis(triethyllead), to tetraethyllead. Hexaethyldilead is unstable and its conversion to tetraethyllead is not reversible.

It is an object of this invention to provide a process for converting to tetraethyllead the high-boiling ethylated lead fraction which is obtained as a by-product in the manufacture of tetraethyllead. A further object is to provide a novel catalytic method for producing such conversion. Another object is to advance the art. Still other objects will appear hereinafter.

The above and other objects may be accomplished in accord with this invention which comprises a process for converting to tetraethyllead an ethylated lead fraction which is obtained as a by-product in the manufacture of tetraethyllead by the ethylation of a sodium lead alloy, is higher-boiling than tetraethyllead and consists predominantly of 1,2-dimethylethylene bis(triethyllead), which process comprises heating said ethylated lead fraction at a temperature of from about 30° C. to about 100° C. in the presence of from about 0.001% to about 10% by weight based on said fraction of a polyvalent-metal compound which is both a Friedel-Crafts catalyst and a Lewis acid, and distilling tetraethyllead from the reaction mixture as it is formed.

It has been found that by such process substantial amounts of tetraethyllead and other valuable tetraalkyllead antiknock compounds can be obtained from such high-boiling by-products which previously were lost or wasted. The process is simple, economical and easy to operate. Extremely high conversions to tetraethyllead and other valuable tetraalkyllead antiknock compounds may be obtained according to the preferred embodiments of the invention.

The high-boiling ethylated lead fraction, with which this invention is concerned, normally appears as a by-product in the ethylation processes which are exemplified by Mitchell in U.S. Patent 2,411,453, by Schlaudecker in U.S. Patent 2,891,977, and by Melvin and Nichols in U.S. Patent 2,907,780. Such fraction can be obtained by steam distillation of the ethylation reaction mass, followed by extraction of the steam distillation residue or sludge with volatile organic solvents such as acetone or aliphatic hydrocarbons, and recovered from such solvents by ordinary distillation techniques. Also, such fraction can be obtained substantially pure or as a residual concentrate by reduced pressure distillation of the organic phase of the ethylation reaction mass, with or without prior steam distillation.

A typical preparation of the high-boiling fraction, which consists essentially or predominantly of the 1,2-dimethylethylene bis(triethyllead) component, distills at temperatures of from about 120° C. to about 130° C. at 1 mm. of Hg pressure, has a refractive index of about 1.560–1.570 ($n_D^{25}$) and a density of about 1.77–1.79 ($d_4^{20}$), whereas tetraethyllead distills between 30° C. and 40° C. at 1 mm. of Hg pressure, has a refractive index of 1.516 and a density of 1.66. It is further differentiated from tetraethyllead in showing strong absorption at 9.5 m$\mu$ in the infrared, which band is absent in tetraethyllead.

The high-boiling ethylated lead fraction, in addition to the 1,2-dimethylethylene bis(triethyllead), may contain minor amounts of other high-boiling ethylated lead compounds of undetermined constitution and high-boiling lead-free compounds. When a carbonyl compound such as acetone is used as an accelerator in the ethylation process, the constituents of the high-boiling ethylated lead fraction will also contain carbonyl groups. The high-boiling ethylated lead fraction may or may not contain hexaethyldilead, depending on the prior processing history, e.g., thermal treatment of the ethylation reaction mass as discussed by Gittens and Mattison in U.S. Patent 2,763,673. Such hexaethyldilead constitutes an additional potential source of tetraethyllead in the process of this invention.

It will be noted that the 1,2-dimethylethylene bis(triethyllead), in having each of its two lead atoms joined to four different saturated carbon atoms, is considered to be of the class tetraalkylleads, in contrast to hexaethyldilead in which each lead atom is joined to another lead atom and to only three ethyl groups. As a "tetraalkyllead," the 1,2-dimethylethylene bis(triethyllead) shows high thermal stability, being at least as or more stable than tetraethyllead in this respect, and far more stable than hexaethyldilead which decomposes at temperatures as low as 80° C.

According to the method of this invention, the high-boiling fraction, whether as the pure "bis" compound, i.e., 1,2-dimethylethylene bis(triethyllead), or as mixtures thereof with other ethylated lead compounds such as tetraethyllead and hexaethyldilead, is treated with a catalyst effective to convert the lead content of the "bis" compound to tetraethyllead. Two molecules of "bis" compound (containing 12 ethyl groups) theoretically can form at most three molecules of tetraethyllead. The exact nature of the transformation is not konwn. However, the process is simple, easy to operate, and produces pure tetraethyllead in high yields.

The catalysts, effective for the purposes of this invention, are polyvalent-metal compounds which are Lewis acids and which are also effective as Friedel-Crafts catalysts. By Lewis acids is meant aprotic substances capable of undergoing neutralization reactions with bases as more fully defined by Luder and Zuffanti in "The Electronic Theory of Acids and Bases," John Wiley and Sons, 1946; and by Hine on pages 46 and 47 of "Physical Organic Chemistry," McGraw-Hill, 1956. By Friedel-Crafts catalysts is meant the metal compounds which are effective to catalyze alkylation and acylation of aromatic hydrocarbons as more fully set forth by Wagner and Zook on pages 317–323 in "Synthetic Organic Chemistry," John Wiley and Sons (1953).

Catalysts are found among the alkyl and halogen compounds of catalytic metals such as Zn, B, Al, Tl, Ga, Zr, Sn, Pb, Ti, Fe, Ru, Bi and Sb. Preferred are the trivalent and tetravalent metal halides wherein the halogen is of atomic number 17–53, especially the chlorides. Aluminum is the preferred catalytic metal. Specifically, the aluminum catalyst, $AlR_3$ wherein R is an alkyl or a halide group of atomic number in the range of 17–53, may be an aluminum alkyl, an aluminum halide or an alkyl aluminum sesquihalide, or a mixture of two or more thereof. Normally, the alkyl groups will contain from 1 to 10 carbon atoms, preferably 1–4 carbon atoms, the size of the alkyl group being limited primarily by reasons of availability and ease of preparation. The halides preferably will be the chlorides for reasons of economy, although the bromides and iodides may also be used.

Representative catalysts of the preferred class are triethyl aluminum, tributyl aluminum, triisobutyl aluminum, methyl aluminum dichloride, diethylaluminum chloride, aluminum chloride, aluminum bromide, and aluminum iodide. The catalyst may be the reaction product of aluminum metal with an alkyl halide, e.g., a $C_1$-$C_{10}$ alkyl chloride, bromide, or iodide, which product generically is an alkyl aluminum sesquihalide, e.g., methyl aluminum sesquichloride and ethyl aluminum sesquichloride. Another example is the reaction product of an aluminum halide, e.g., $AlCl_3$, $AlBr_3$, with a tetraalkylmonolead, e.g., tetramethyl-, tetraethyl-, or tetrabutyl-lead, which reaction product consists essentially of a mixture of alkyl aluminum halides and alkyl lead halides. Catalysts higher boiling than tetraethyllead are preferred, especially aluminum chloride for reasons of economy and ease of handling.

Lead compounds, which are Lewis acids and which are also effective as Friedel-Crafts catalysts, are also desirable catalysts for the process of this invention, although considerably less effective than the aluminum compounds. Tetraalkylleads can be converted readily to dialkyllead halides and to lead dihalides by a variety of acidic halides, including HCl. Thus, it would be a simple and practical matter to treat the high-boiling ethylated lead fraction with a small amount of such an acidic halide to form in situ the catalytic lead halide substance, and then to effect the process of this invention by the distillation of the reaction mass to strip off the tetraethyllead. Particularly suitable lead compounds are lead halides in which the halogen has an atomic number in the range of 17–53, preferably lead dichloride, and the dialkyl lead dihalides in which each alkyl group contains 1–10 carbon atoms and the halogen has an atomic number in the range of 17–53, preferebly the dialkyl lead dichlorides in which each alkyl group contains 1–4 carbon atoms, and most preferably diethylleaddichloride.

Examples of other catalytic metals, in suitable Lewis acid and Friedel-Crafts form, are $ZnCl_2$, $BF_3$, $GaCl_3$, $GaBr_3$, $TlCl_3$, $SnCl_4$, $SnI_4$, $BiCl_3$, $SbCl_5$, $FeCl_3$, $RuCl_3$, $TiCl_4$ and $ZrCl_4$.

Mixtures of catalysts may be employed.

When an alkyl metal compound that contains alkyl groups other than ethyl is employed, the tetraethyllead product may contain minor proportions of organolead compounds of the class of tetraalkylmonolead compounds wherein at least one alkyl group is other than ethyl, i.e., originates in the alkyl bearing catalyst. For example, the tetraethyllead product, obtained by treating the high-boiling ethylated lead fraction with methylaluminum sequichloride, may contain small amounts of methyltriethyllead and the like.

The catalyst may be employed in a proportion of from about 0.001% to about 10% by weight based on the high-boiling ethylated lead fraction. Larger quantities tend to be wasteful, but smaller quantities, i.e., trace quantities, may be employed. It should be understood that, when the tetraethyllead is removed as formed from the reaction mass of the high-boiling ethylated lead fraction and the catalyst, the concentration of the catalyst increases relative to the reaction mass as the high-boiling ethylated lead compound is converted to tetraethyllead. Thus, when trace quantities of catalyst are employed, the production of tetraethyllead tends to be slow at first but increases with time. Usually, at least about 1% by weight of catalyst will be used for rapid conversion of the high-boiling ethylated lead compound to tetraethyllead, and preferably from about 5% to about 10% by weight.

The temperature of the process is usually in the range of from about 30° C. to about 100° C. To minimize the possible decomposition of the tetraethyllead produced, it is preferred to employ temperatures well below 100° C. From about 40° C. to about 60° C. is ordinarily effective for rapid conversion of the high-boiling ethylated lead compound to tetraethyllead.

Also, to minimize exposure of the tetraethyllead to thermal treatment, it is preferred to remove it as it is formed from the reaction zone. Conveniently, this is accomplished by maintaining the system at a reduced pressure for a given temperature at which tetraethyllead distills, but the high-boiling compound and the catalyst do not. The tetraethyllead flashes off as it is formed, and is collected. For example, the pressure is reduced to 10 mm. of Hg or below at about 80° C., and to 2 mm. or below, e.g., 0.1–1 mm., at about 50° C. to allow the tetraethyllead to distill from the reaction zone.

In order to more clearly illustrate this invention, preferred modes of carrying it into effect, and the advantageous results to be obtained thereby, the following examples are given in which the proportions are by weight, except where specifically indicated otherwise.

*Example 1*

The high-boiling ethylated lead fraction used in this example was obtained as follows from the reaction mass produced on reacting ethyl chloride with sodium lead alloy essentially as described by Schlaudecker in U.S. Patent 2,891,977. The tetraethyllead was stripped from the organic product by distillation under reduced pressure and the residue held at 55° C. and 0.25 mm. of Hg pressure until distillation ceased. The residue was a liquid of refractive index $n_D^{25}$ 1.5574, density $d_4^{20}$ 1.789, and showing a strong band at 9.5 m$\mu$ in the infrared.

This residue appears to consist of at least about 95% by weight of 1,2-dimethylethylene bis(triethyllead), the rest being unidentified.

26 parts by weight of aluminum chloride was added to 358 parts by weight of the above high-boiling residue in a simple distillation apparatus equipped with reduced pressure means and a cooled (−78° C.) receiver. This corresponds to 7.26% by weight of $AlCl_3$ based on the residue, or about 7.6% by weight based on the estimated content of 1,2 - dimethylethylene bis(triethyllead). The pressure was adjusted and held at 0.25 mm. of Hg. The reaction mixture was held at about 50° C. by external heating while being stirred for about 2 hours, at the end of which time 239 parts of pure tetraethyllead ($n_D^{25}$ 1.5167, $d_4^{25}$ 1.66) had collected in the receiver. The tetraethyllead recovered corresponds to 89% of the theoretical quantity, assuming that the residue consisted entirely of the 1,2-dimethylethylene bis(triethyllead), 2 molecules of which are equivalent to 3 molecules of tetraethyllead.

Similar results may be obtained on (a) reducing the quantity of aluminum chloride catalyst to 0.7%, 0.07% and 0.007% by weight of the residue, or (b) employing as catalyst any of $AlBr_3$, $AlI_3$, ethyl aluminum sesquichloride, and triisobutyl aluminum.

Example 2

An ethylation reaction mass fraction, having a refractive index $n_D^{25}=1.552$, was obtained essentially as described in Example 1, and by $I_2$-titration, was equivalent to about 96% by weight of tetraethyllead, the rest being non-organic lead. 360 parts of this fraction was admixed with about 20 parts of the inorganic portion of an ethylation reaction mass which consisted essentially of lead and sodium chloride. The mixture was held at 50° C. and 0.2 mm. of Hg pressure for 1.25 hours according to the method of Example 1. No tetraethyllead appeared in the receiver during this treatment. Then 20 parts of lead dichloride ($PbCl_2$) was added to the mixture and heating as before at about 0.2 mm. was resumed. The $PbCl_2$ amounted to 5.6% by weight based on the total high-boiling fraction or about 6.2% by weight based on the estimated content of 1,2-dimethylethylene bis(triethyllead). This time, 25.3 parts of tetraethyllead was obtained as distillate in one hour.

Example 3

25 parts of diethylleaddichloride was mixed with 358 parts of a high-boiling fraction which was obtained essentially as described in Example 1 and which was similar to that treated in Example 1. The catalyst corresponded to about 7% by weight based on the high-boiling fraction or about 7.5% by weight based on the estimated content of 1,2-dimethylethylene bis(triethyllead). The mixture was held at 50° C. and 0.2 mm. of Hg pressure for one hour by the method of Example 1 to yield 96 parts of tetraethyllead as distillate.

It will be understood that the preceding examples have been given for illustrative purposes only and that this invention is not restricted to the specific embodiments described therein. On the other hand, it will be readily apparent to those skilled in the art that, subject to the limitations set forth in the general description, many variations and modifications can be made in the catalyst and conditions employed without departing from the spirit or scope of this invention.

From the preceding description, it will be apparent that this invention provides a novel process for recovering valuable tetraalkyllead antiknock compounds from by-products obtained in the manufacture of tetraethyllead which heretofore were lost or wasted. The results are particularly outstanding with the preferred catalyst of the invention. The catalysts are cheap and readily available and the process is easy and economical to operate. Accordingly it will be apparent that this invention constitutes a valuable advance in and contribution to the art.

The embodiments of the invention in which an exclusive property or privilege is claimed are defined as follows:

1. A process for converting to tetraethyllead an ethylated lead fraction which has been obtained as a by-product in the manufacture of tetraethyllead by the ethylation of a sodium lead alloy and boils higher than 55° C. at 0.25 mm. of Hg pressure, which comprises the step, separate from said ethylation step, of heating said ethylated lead fraction at a temperature of from about 30° C. to about 100° C. in the presence of from about 0.001% to about 10% by weight based on said fraction of a catalyst which consists essentially of a polyvalent-metal compound which is both a Friedel-Crafts catalyst and a Lewis acid, and removing tetraethyllead from the reaction mixture.

2. A process for converting to tetraethyllead an ethylated lead fraction which has been obtained as a by-product in the manufacture of tetraethyllead by the ethylation of a sodium lead alloy and boils higher than 55° C. at 0.25 mm. of Hg pressure, which comprises the step, separate from said ethylation step, of heating said ethylated lead fraction at a temperature of from about 30° C. to about 100° C. in the presence of from about 5% to about 10% by weight based on said fraction of a catalyst which consists essentially of a polyvalent-metal compound which is both a Friedel-Crafts catalyst and a Lewis acid, and removing tetraethyllead from the reaction mixture.

3. A process for converting to tetraethyllead an ethylated lead fraction which has been obtained as a by-product in the manufacture of tetraethyllead by the ethylation of a sodium lead alloy, is higher boiling than tetraethyllead and consists predominantly of 1,2-dimethylethylene bis(triethyllead), which comprises the step, separate from said ethylation step, of heating said ethylated lead fraction at a temperature of from about 40° C. to about 60° C. in the presence of from about 5% to about 10% by weight based on said fraction of a catalyst which consists essentially of a polyvalent-metal compound which is both a Friedel-Crafts catalyst and a Lewis acid, and distilling tetraethyllead from the reaction mixture as it is formed.

4. A process for converting to tetraethyllead an ethylated lead fraction which has been obtained as a by-product in the manufacture of tetraethyllead by the ethylation of a sodium lead alloy, is higher boiling than tetraethyllead and consists predominantly of 1,2-dimethylethylene bis(triethyllead), which comprises the step, separate from said ethylation step, of heating said ethylated lead fraction at a temperature of from about 30° C. to about 100° C. in the presence of from about 0.001% to about 10% by weight based on said fraction of a catalyst which consists essentially of an aluminum compound which is both a Friedel-Crafts catalyst and a Lewis acid, and distilling tetraethyllead from the reaction mixture as it is formed.

5. A process for converting to tetraethyllead an ethylated lead fraction which has been obtained as a by-product in the manufacture of tetraethyllead by the ethylation of a sodium lead alloy, is higher boiling than tetraethyllead and consists predominantly of 1,2-dimethylethylene bis(triethyllead), which comprises, the step, separate from said ethylation step, of heating said ethylated lead fraction at a temperature of from about 40° C. to about 60° C. in the presence of from about 5% to about 10% by weight based on said fraction of a catalyst which consists essentially of an aluminum compound which is both a Friedel-Crafts catalyst and a Lewis acid, and distilling tetraethyllead from the reaction mixture as it is formed.

6. A process for converting to tetraethyllead an ethylated lead fraction which has been obtained as a by-product in the manufacture of tetraethyllead by the ethylation of a sodium lead alloy, is higher boiling than tetraethyllead and consists predominantly of 1,2-dimethylethylene bis (triethyllead), which comprises the step, separate from said ethylation step, of heating said ethylated lead fraction at a temperature of from about 40° C. to about 60° C. in the presence of from about 5% to about 10% by weight based on said fraction of a catalyst which consists essentially of an aluminum halide in which the halogen has an atomic number in the range of 17 to 53, and distilling tetraethyllead from the reaction mixture as it is formed.

7. A process for converting to tetraethyllead an ethylated lead fraction which has been obtained as a by-product in the manufacture of tetraethyllead by the ethylation of a sodium lead alloy, is higher boiling than tetraethyllead and consists predominantly of 1,2-dimethylethylene bis(triethyllead), which comprises the step, separate from said ethylation step, of heating said ethylated lead fraction at a temperature of from about 40° C. to about 60° C. in the presence of from about 5% to about 10% by weight based on said fraction of a catalyst which consists essentially of aluminum chloride, and distilling tetraethyllead from the reaction mixture as it is formed.

8. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 40° C. to about 60° C. in the presence of from about 5% to about 10% by weight based on said fraction of an aluminum trialkyl in which each alkyl radical contains 1–4 carbon atoms, and distilling tetraethyllead from the reaction mixture as it is formed.

9. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 40° C. to about 60° C. in the presence of from about 5% to about 10% by weight based on said fraction of an alkyl aluminum sesquihalide in which the alkyl radical contains 1–4 carbon atoms and the halogen has an atomic number in the range of 17–53, and distilling tetraethyllead from the reaction mixture as it is formed.

10. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 40° C. to about 60° C. in the presence of from about 5% to about 10% by weight based on said fraction of methyl aluminum sesquichloride, and distilling tetraethyllead from the reaction mixture as it is formed.

11. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 30° C. to about 100° C. in the presence of from about 0.001% to about 10% by weight based on said fraction of a lead compound which is both a Friedel-Crafts catalyst and a Lewis acid, and distilling tetraethyllead from the reaction mixture as it is formed.

12. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 40° C. to about 60° C. in the presence of from about 5% to about 10% by weight based on said fraction of a lead compound which is both a Friedel-Crafts catalyst and a Lewis acid, and distilling tetraethyllead from the reaction mixture as it is formed.

13. A process for converting to tetraethyllead an ethylated lead fraction which is obtained as a by-product in the manufacture of tetraethyllead by the ethylation of a sodium lead alloy, is higher boiling than tetraethyllead and consists predominaantly of 1,2-dimethylethylene bis (triethyllead), which comprises heating said ethylated lead fraction at a temperature of from about 40° C. to about 60° C. in the presence of from about 5% to about 10% by weight based on said fraction of a lead dihalide in which the halogen has an atomic number in the range of 17 to 53, and distilling tetraethyllead from the reaction mixture as it is formed.

14. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 40° C. to about 60° C. in the presence of from about 5% to about 10% by weight based on said fraction of lead dichloride, and distilling tetraethyllead from the reaction mixture as it is formed.

15. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 40° C. to about 60° C. in the presence of from about 5% to about 10% by weight based on said fraction of a dialkyl lead dihalide in which the alkyl group contains 1–4 carbon atoms and the halogen has an atomic number in the range of 17 to 53, and distilling tetraethyllead from the reaction mixture as it is formed.

16. A process for converting to tetraethyllead an ethylated lead fraction which is obtained as a by-product in the manufacture of tetraethyllead by the ethylation of a sodium lead alloy, is higher boiling than tetraethyllead and consists predominantly of 1,2-dimethylethylene bis (triethyllead), which comprises heating said ethylated lead fraction at a temperature of from about 40° C. to about 60° C. in the presence of from about 5% to about 10% by weight based on said fraction of diethyllead-dichloride, and distilling tetraethyllead from the reaction mixture as it is formed.

References Cited in the file of this patent

UNITED STATES PATENTS

| | | |
|---|---|---|
| 1,962,173 | Calcott et al. | June 12, 1934 |
| 2,270,108 | Calingaert et al. | Jan. 13, 1942 |
| 2,414,058 | Pearsall | Jan. 7, 1947 |